Jan. 8, 1963    O. R. IDING    3,072,231

MEMORY SEAT ADJUSTMENT CONTROL CIRCUIT

Filed June 8, 1959    4 Sheets-Sheet 1

INVENTOR.
ORVILLE R. IDING
BY Whittemore
Hulbert & Belknap
ATTORNEYS

Jan. 8, 1963 O. R. IDING 3,072,231
MEMORY SEAT ADJUSTMENT CONTROL CIRCUIT
Filed June 8, 1959
4 Sheets-Sheet 2

INVENTOR.
ORVILLE R. IDING
BY Whittemore
Hulbert & Belknap
ATTORNEYS

INVENTOR.
ORVILLE R. IDING
BY Whittemore
Hulbert & Belknap
ATTORNEYS

Jan. 8, 1963 O. R. IDING 3,072,231

MEMORY SEAT ADJUSTMENT CONTROL CIRCUIT

Filed June 8, 1959 4 Sheets-Sheet 4

INVENTOR.
ORVILLE R. IDING
BY Whittemore
Hulbert & Belknap
ATTORNEYS

United States Patent Office 3,072,231

Patented Jan. 8, 1963

3,072,231
MEMORY SEAT ADJUSTMENT CONTROL CIRCUIT

Orville R. Iding, Detroit, Mich., assignor to Ferro Stamping Company, Detroit, Mich., a corporation of Michigan Filed June 8, 1959, Ser. No. 818,881
17 Claims. (Cl. 192—.02)

The present invention relates to an electrical circuit for a memory seat control system.

In applicant's copending application Serial Number 739,721, now abandoned, an electrical control circuit for a seat control system capable of effecting movement of a seat from any intermediate position to a fully lowered and retracted position or to either of two preset intermediate positions by the actuation of a single switch is disclosed. The control system disclosed in the above referenced application is very compact considering previous systems operable to perform similar functions and operates satisfactorily. However, in the interest of economy it is desirable that such a control circuit have even fewer elements and be less complicated both in structure and in operation than the previously disclosed system. For example, a circuit capable of performing the functions of the control circuit disclosed in the above mentioned application and necessitating the use of fewer relays and switches or performing other functions such as breaking the circuit through the motor from the source of electrical energy on full lowering and retracting of the seat would be an improvement over the control circuit disclosed in the cited application.

Therefore it is one of the objects of the present invention to provide a memory control system for automobile seats or the like including a control circuit wherein a minimum of circuit elements are used to provide maximum control of the control system.

Another object is to provide a memory control system for automobile seats or like structures including a control circuit capable of effecting movement of the structure from any intermediate position to a fully lowered and retracted position or to either of two preset intermediate positions by the actuation of a single restoring switch in a more economical manner than with other known control circuits through the use of fewer components uniquely combined to perform more functions.

More specifically it is an object to provide a memory control system for automobile seats or like structures including an actuating motor and a control circuit capable of effecting movement of the structure from any intermediate position to a fully lowered and retracted position or to either of two preset intermediate positions by the actuation of a single restoring switch, including limit switches operable to prevent energization of the motor after the seat reaches a fully lowered and retracted position.

Still more specifically it is one of the objects to provide a memory control system for automobile seats or like structures including a control circuit capable of effecting movement of the structure from any intermediate position to a fully lowered and retracted position or to either of two preset intermediate positions by the actuation of a single restoring switch, including a plurality of limit switches connected in a plurality of parallel circuits in series between a source of electrical energy and each of a plurality of clutch actuating solenoids, said limit switches being operable to deenergize said solenoids sequentially as said seat is moved to a fully lowered and retracted position, and also including a retracting switch having a plurality of sets of contacts insulated from each other and closable on actuation of a single switch to complete said plurality of parallel circuits from said source of electrical energy through separate ones of said limit switches to separate ones of said solenoids.

Other objects and features of the invention will become apparent as the description proceeds, especially when taken in conjunction with the accompanying drawings, illustrating preferred embodiments of the invention, wherein.

Figure 1:
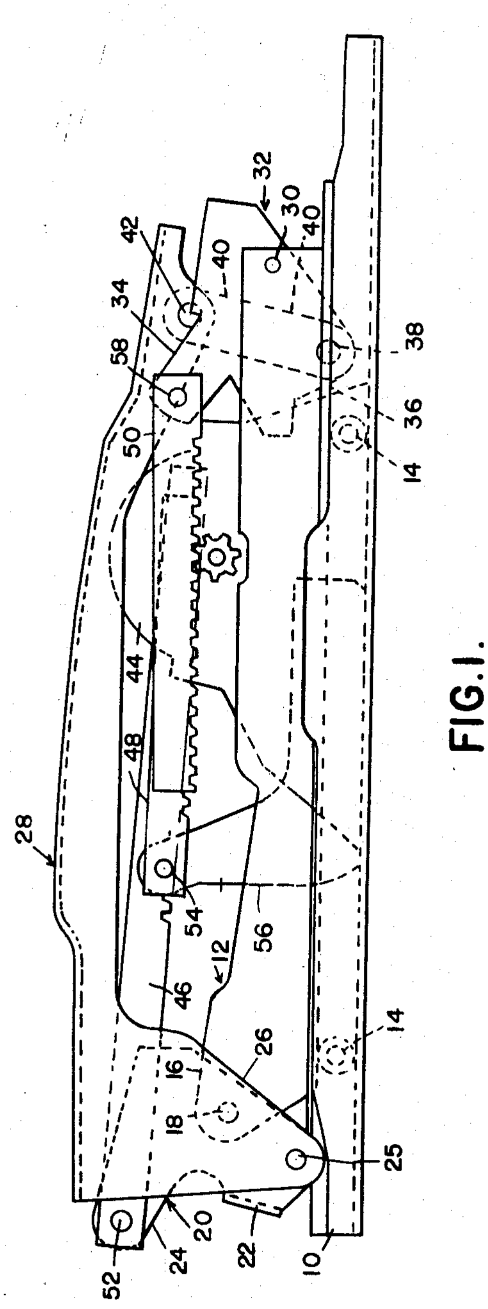
FIGURE 1 is an elevational view of a seat supporting and adjusting mechanism suitable for use with a memory control system including a control circuit according to the invention.

Referring now to the drawings, the memory control system for seat adjustment is illustrated as applied to a seat in which adjustment is effected by providing a lower slide movable fore and aft of the vehicle on fixed rails, and seat support frame elements are pivoted by levers at the front and rear ends to the slide. Obviously, fore and aft movement of the slide effects fore and aft adjustment of a seat mounted on the seat frame elements. The levers which interconnect the front and rear ends of the slide and seat frame elements are preferably bell type crank levers so connected as to cause rocking movement of the levers to produce generally up and down movement of the corresponding ends of the seat frame elements. With this arrangement it is of course apparent that by suitably actuating the levers at both the front and rear of the seat frame elements, the seat may be raised or lowered. If only one of such levers is actuated the seat is tilted either forwardly or rearwardly.

The foregoing seat adjusting mechanism is best illustrated in FIGURE 1 where one of the stationary rails or tracks is indicated at 10 adapted to be bolted or otherwise secured to the floor of the vehicle. It will of course be understood that a pair of such rails are provided located adjacent opposite ends of the seat and similarly, a pair of slides and seat frame elements are also provided.

Mounted for fore and aft adjustment on the stationary rail or track 10 is a slide 12, suitable rollers for providing for relatively free adjustment of the slide 12 being shown at 14. Adjacent the forward end of the slide 12 is an upstanding ear 16 affording a pivot mounting as indicated at 18 for a bell crank lever 20 having a lifting arm 22 and an actuating arm 24. Pivotally connected, as indicated at 25, to the lifting arm 22 of the bell crank lever 20 is a depending arm 26 of the seat frame element 28.

Similarly, a pivot mounting 30 is provided adjacent the rear end of the slide 12 to which is secured a bell crank lever 32 having an actuating arm 34 and a lift arm 36. The lift arm 36 has pivotally connected thereto, as indicated at 38, a lifting link 40 the upper end of which is pivotally connected, as indicated at 42, to the rear end of the seat frame element 28.

In order to effect power actuation of the seat to various adjusted positions, there is provided for movement with the slide 12 a drive unit 44 having therein three pinions (not shown) each of which is in mesh with an actuating rack. The three actuating racks are shown at 46, 48 and 50. The rack 46 at its forward end is pivotally connected as indicated at 52 to the actuating arm 24 of the front lift bell crank lever 20. The rack 48 is pivotally connected as indicated at 54 to a stationary post 56 which may be connected to the stationary rail or track member 10, or may be connected directly to the floor of the vehicle. The rack 50 is pivotally connected as indicated at 58 to the actuating arm 34 of the rear lift bell crank lever 32.

Each of the three pinions in mesh with the racks 46, 48 and 50 is separately actuated and in accordance with the present invention a single electric motor may be provided selectively coupled to one or more of the pinions by flexible drive shafts which are selectively clutched to the transmission means. Such single motor multiple drive units are fully set forth in copending applications Serial Numbers 540,917, now Patent No. 2,931,242 and 680,306, now abandoned, and will therefore be considered only briefly herein. Reference is made to the cited commonly owned copending applications for a detailed consideration of particular single motor multiple drive units.

Figure 2:
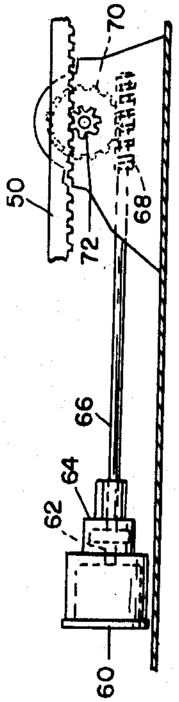
FIGURE 2 is a diagrammatic view showing the connection from a motor through a clutch to a worm actuating a rack driving pinion for imparting movement to a seat supporting and adjusting mechanism such as shown in FIGURE 1.

Referring now to FIGURE 2 there is shown more or less diagrammatically a motor 60 having an output shaft 62 connected to a gear and clutch box indicated generally at 64. Within the box 64 are a plurality of intermeshing gears driven from the motor 60 each of which is connected through a solenoid actuated clutch to a flexible drive cable one of which is shown at 66 leading to a worm 68 in mesh with a worm gear 70 keyed or otherwise secured to a pinion 72 which is in mesh with one of the racks 46, 48 or 50, as for example the rack 50. It will be apparent that by operation of suitable electrical circuitry, the motor 60 may be energized and the appropriate one or more of the solenoids within the box 64 energized to connect the motor to the corresponding flexible drive cable which in turn effects actuation of a corresponding one of the racks.

Referring now to FIGURES 3–10 there is shown the memory control device which is adapted to be carried by and hence movable with the seat or a seat frame element 28. The memory device includes three setting levers 74, 76 and 78. The lever 74 is connected by a link 80 to the actuating arm 24 of the front lift bell crank lever 20. The lever 76 is connected by a link 82 to the actuating arm 34 of the rear lifting bell crank lever 32. The third lever 78 is connected by a link 84 to the stationary post 56 carried by the stationary rail or track 10 or a similar post fixedly mounted on the floor of the vehicle.

From the foregoing it will be seen that for each of the infinite number of intermediate positions which may be occupied by the adjustable vehicle seat, there will be corresponding positions of the setting levers 74, 76 and 78.

Figure 8:
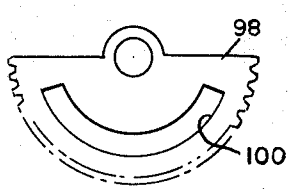
FIGURE 8 is an elevational view of a toothed sector employed in the assembly of FIGURE 6.
Figure 9:
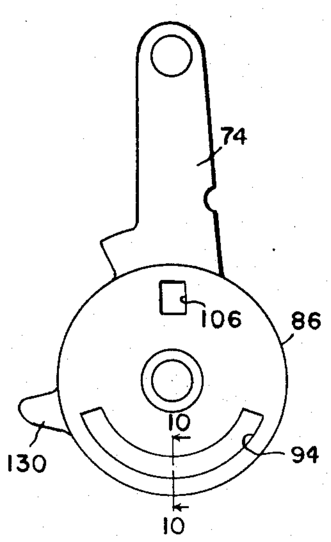
FIGURE 9 is an elevational view of a position responsive setting lever employed in the assembly of FIGURE 6.

Referring more particularly to FIGURES 6–10, each of the levers 74, 76 and 78 extend from generally cylindrical discs 86 provided with central openings by means of which they are mounted for rotation on a tubular support or bearing member 88. Rigidly affixed to opposite sides of the discs 86 are plates 90 provided with elongated arcuate slots 92. As best seen in FIGURE 9, each of the discs

Figure 10:
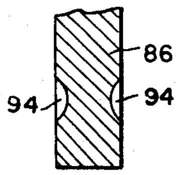
FIGURE 10 is a fragmentary section on the line 10—10, FIGURE 9.

86 is provided with similar arcuate recesses 94 which are of arcuate cross-section as best seen in FIGURE 10.

Figure 6:
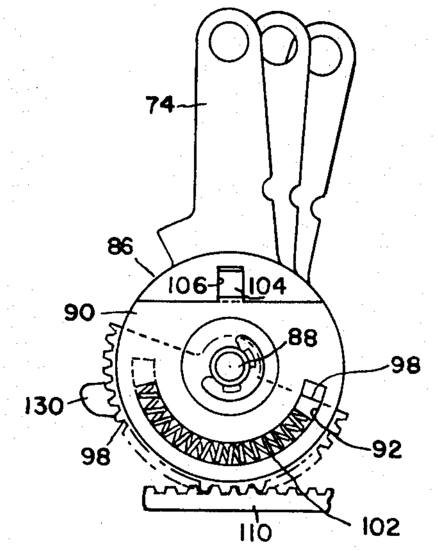
FIGURE 6 is a fragmentary elevational view of a part of the position setting device.
Figure 7:
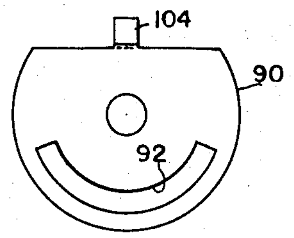
FIGURE 7 is an elevational view of a spring retainer plate used in the assembly shown in FIGURE 6.

Mounted on bearing member 88 on opposite sides of each of the discs 86 and between the discs and the adjacent plates 90 are a pair of toothed sectors 98. Each of the toothed sectors, as best illustrated in FIGURE 8, is provided with an elongated arcuate slot 100. Received in the slot 100 in the toothed sectors 98 are coil compression springs 102. The compression springs extend partly into the arcuate slots 92 in the plates 90 and are partly received in the arcuate recesses 94 at the opposite sides of the discs 86. With the parts in the position illustrated in FIGURE 6 the ends of the arcuate slots 100 are not in alignment with the ends of the slots 92 and arcuate recesses 94 which are in alignment. It will be apparent that in this condition the spring 102 is under appreciable compression and the sectors are spring biased to return to a position in which the ends of the arcuate slots 100 therein are in alignment with the ends of the recesses 94 and slots 92. However, relative angular movement between the discs 86 and the associated arms 74, 76 or 78 and either or both of toothed sectors associated therewith is permitted. It may be mentioned at this time that the plates 90 which are located at opposite sides of each of the discs 86 are connected thereto by a finger 104 which is received in a recessed seat 106, the seats being located at opposite sides of each of the discs 86 and each pair together forming an aperture through the individual discs 86 as shown in FIGURES 6 and 9.

Figure 4:
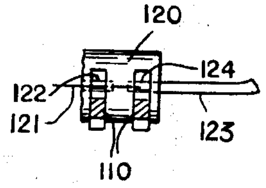
FIGURE 4 is a fragmentary vertical section on line 4—4, FIGURE 3.
Figure 5:
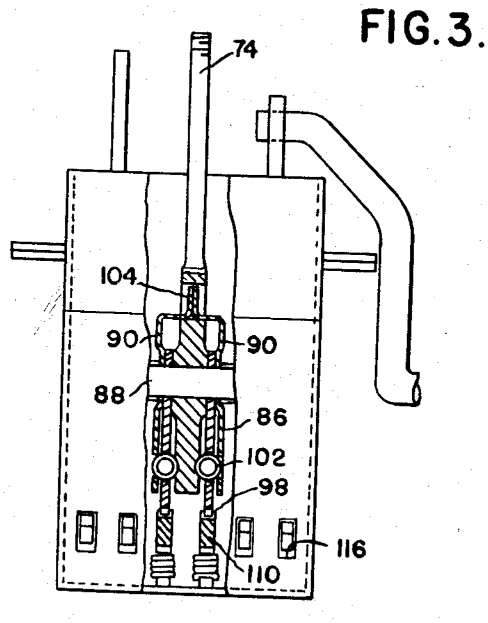
FIGURE 5 is a fragmentary elevational view partly in section of the memory control device.

The memory device comprises a housing 108 in which are located six switch actuating rack bars 110, one being associated with each of the toothed sectors. The rack bars have ears 112 at one end which form a loose pivot support and permits limited longitudinal movement thereof. The opposite end of each of the rack bars, as indicated at 114, is vertically movable in a slot 116 in the housing 108. Suitable spring means such for example as indicated at 118 biases the several rack bars upwardly. Mechanically operable means indicated at 120 are provided for depressing one rack bar associated with each of the three discs and lever devices. As indicated, the actuator comprises a slotted cylinder mounted for rotation about its axis 121 and having abutments 122 engageable with one of the rack bars associated with three of the levers, and abutments 124 associated with the remaining rack bars and levers. A section of the cylinder 120 is shown in FIGURE 4. It will be understood that three such sections in axial alignment are provided in connection with the three sets of rack bars associated with the three levers 74, 76 and 78. The three sections of cylinders 120 are rotatable about the common axis 121 by any convenient means such as a drive cable 123 attached at one end to the end section 120 and at the other end to suitable drive means (not shown).

Figure 3:
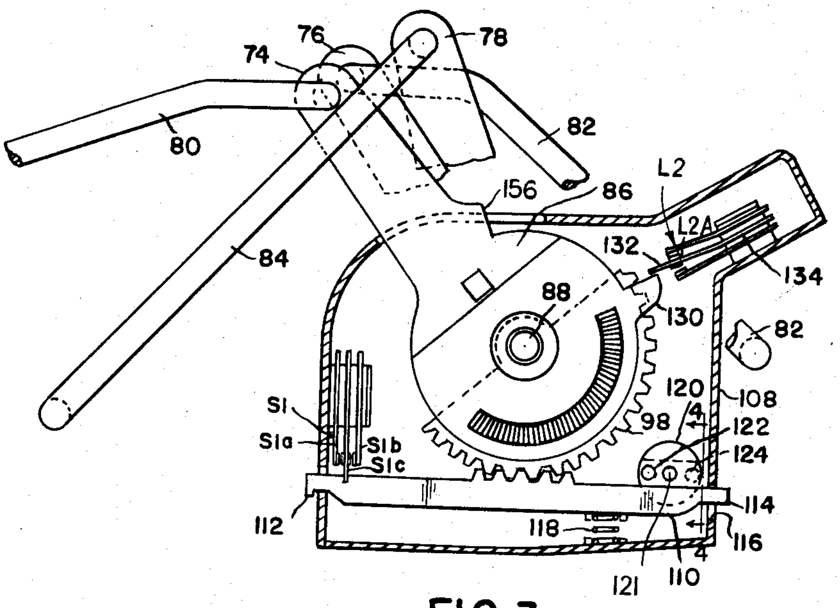
FIGURE 3 is a fragmentary elevational view showing a control device and mechanical connections therefor suitable for use with the seat supporting and adjusting mechanism shown in FIGURE 1 and the memory control system and control circuit of the invention.

In the position illustrated in FIGURES 3 and 4 each of the rack bars 110 is permitted limited longitudinal movement. Provided in the housing 108 in association with each of the rack bars 110 are switches S1, S2, S3, S4, S5 or S6. In FIGURES 3 and 4 it is assumed that the switch is S1 and it comprises contacts S1*a* and S1*b*, together with an intermediate movable contact S1*c* carried by a spring arm connected to the rack bar 110. With the rack bar in the position illustrated in FIGURES 3 and 4 it will be noted that the intermediate contacts S1*c* of the switch S1 is spaced from the two contacts S1*a* and S1*b*. However, limited movement of the rack in either direction will close the center contact with either of the contacts S1*a* or S1*b*, at which time the sector, lever and spring may be as seen in FIGURE 6.

If it is assumed that the rack bar 110 is associated with a sector 98 associated with the lever 74, it will be apparent that operation of the rack which produces rocking movement of the lever 20 in either direction from the illustrated position will initially cause longitudinal movement of the rack bar 110 so as to close one of the switch contacts S1*a*, S1*c*, or S1*b*, S1*c*. Since the contact S1*c* is carried by a flexible arm, the contacts will remain closed while the rack bar 110 undergoes its relatively limited longitudinal movement. Thereafter, continued movement of the lever 20 will result in continued angular movement of the lever arm 74. At this time the rack bar 110 is prevented from moving and accordingly the spring 102 becomes compressed as the end of the recess 94 in the disc 86 and the end of the slot 92 in the plate 90 carry one end of the spring away from one end of the slot 100 in the toothed sector 98. So long as the seat remains out of adjustment the spring will remain compressed and the switch S1 will remain closed in one direction or the other. However, when the seat is brought back so that the lever 20 occupies the position which it initially occupied, the intermediate switch contact S1*c* resumes its neutral intermediate position as shown in the figure.

Means are provided for operating the setting levers 74, 76 and 78 to establish a memory control for two intermediate seat positions which may for convenience be designated "His" and "Hers."

It will be understood that the memory system disclosed herein is associated with a multiple position manually controlled seat adjusting mechanism of the usual type so that the operator or two operators of the vehicle may initially adjust the front seat to the position which best suits them. During such adjustment the rack bars 110 will be in the upper position shown in FIGURE 3 and accordingly, movement of the seat to the adjusted position will effect movement of the rack bars 110 out of the neutral position and into a limiting position as determined by abutments thereon engageable with adjacent portions of the housing 108. The longitudinal movement permitted the rack bars is relatively slight. After the bars have moved to a limiting position, further movement of the seat will have the effect of compressing the spring 102 as a result of movement of one end thereof by the ends of the recess 94 and slot 92. After the seat has been brought into a preselected position, and assuming that the adjustment has been accomplished by the individual who is to use the so-called "His" control switch, then the mechanically operable means 120 is rotated in the appropriate direction to depress one of the rack bars associated with each of the setting levers 74, 76 or 78. When the rack bars are dropped to a position in which they release the toothed sectors 98, the sectors immediately return to an intermediate or center position with respect to the disc 86 of the associated setting lever. The manually operated mechanism 120 is then released and the racks move upwardly into meshed engagement with the toothed sectors. At this time the switches controlled by the three "His" rack bars are open. These switches will be open only when the seat is in the "His" position and will be closed in one direction or the other at any time when the seat is out of this adjusted position. It may also be noted that when the seat is in the "His" position all of the "Hers" switches will be closed in one direction or the other.

Limit switches are provided in association with the memory control device operable to terminate seat movement when the seat has reached its fully lowered and fully retracted position. For this purpose a plurality of single pole, single throw, normally closed limit switches L2, L3, and L4 are provided.

Each of the discs 86 includes a radial projection 130 which is engageable with a projection 132 on the flexible arm 134 which carries a movable contact L2*a*, L3*a*, or L4*a*. The projections 130 are so located that as each of the setting levers 74, 76 and 78 reaches a position corresponding to the fully lowered and retracted position of the seat, its projection 130 shifts the movable contact of the associated limit switch out of engagement with its stationary contact.

Figure 11:
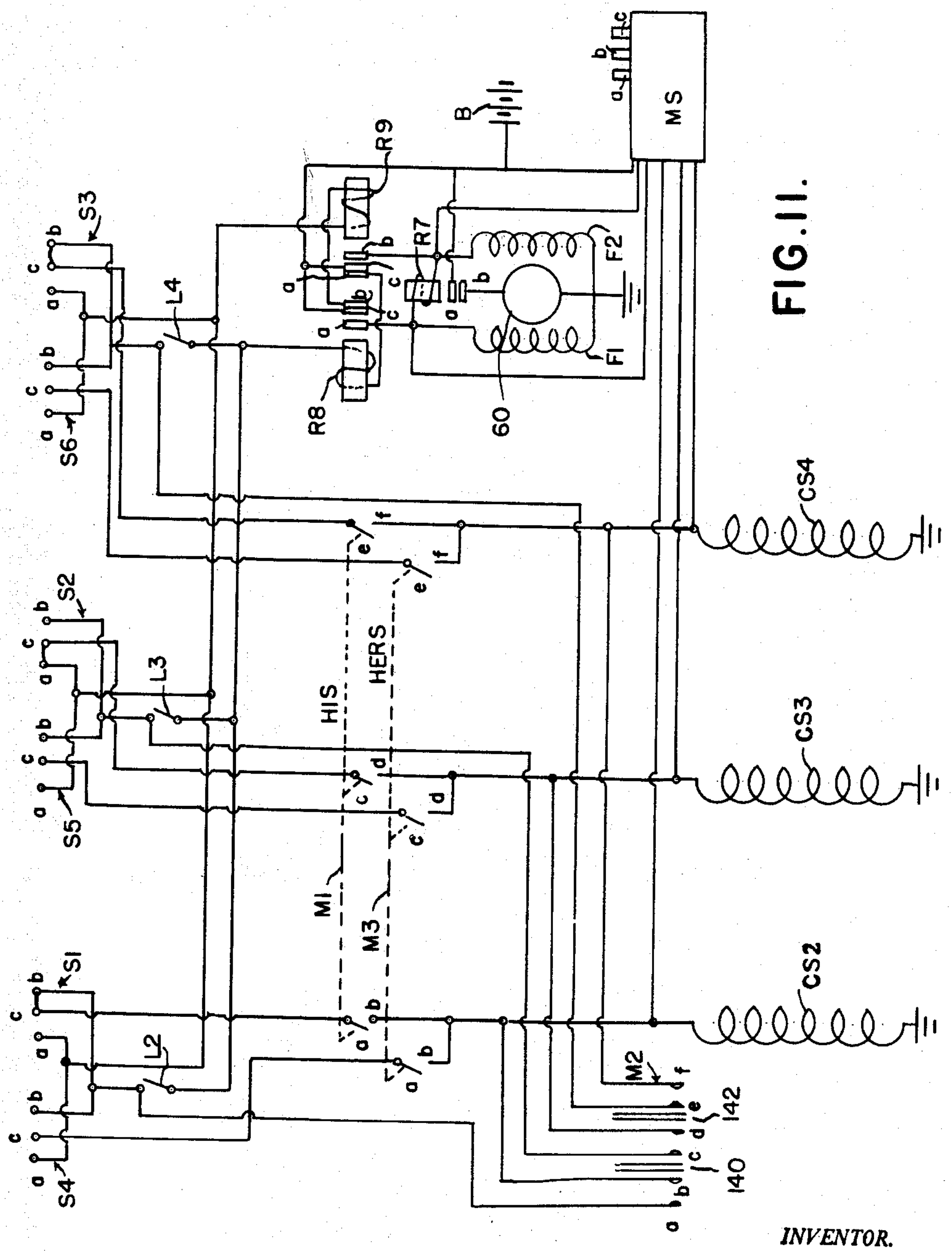
FIGURE 11 is a wiring diagram of a simplified improved control circuit for a memory control system according to the invention.

Referring now to FIGURE 11 there is shown the electrical circuit for effecting movement of the seat from any intermediate position to either a fully lowered and retracted position or to either of two preselected intermediate positions. The circuit is connected to the usual manual control circuit effected by a manual switch MS having three buttons MS*a*, MS*b*, and MS*c* which are adapted when depressed to energize the motor 60 in either forward or reverse direction and to connect the appropriate one of the clutch actuating solenoids CS2, CS3 and CS4.

The improved electrical circuit according to the invention for effecting automatic movement of the seat to a fully lowered and retracted position or either of two preselected intermediate positions shown in FIGURE 11 includes a source of electrical energy designated B which may be the battery of a vehicle, a motor 60, motor actuating relays R8 and R9 and clutch actuating solenoids CS2, CS3 and CS4. The electrical control circuit for effecting automatic movement of the seat also includes a retracting switch M2 and previously mentioned limit switches L2, L3 and L4. A pair of triple pole, single throw selector switches generally designated M1 and M3 and indicated as "His" and "Hers" respectively, are also provided in the electrical control circuit. The sensing switches S1, S2 and S3 previously described are provided in conjunction with the "His" selector switches to perform a memory function in the electrical control circuit and a similar set of sensing switches S4, S5 and S6 are provided for use in conjunction with the "Hers" selector switch also to perform a memory function in the electrical control circuit.

The motor 60 includes field windings F1 and F2 which are selectively energizable through relays R8 and R9 to cause rotation of the motor 60 in opposite directions. Relays R8 and R9 are connected in series between the source of electrical energy B and the motor windings F1 and F2. Relay R8 includes relay contacts R8*a*, R8*b* and R8*c*. Relay R9 includes relay contacts R9*a*, R9*b* and R9*c*. An electrical circuit may be completed through relay R8 by closing either the retracting switch M2 or one of the selector switches M1 and M3 through circuits which will be more fully described later and which include the contacts R9*c* and R9*a* and the coil of the relay R8. Likewise a circuit may be completed through relay R9 by closing the retracting switch M2 or one of the selector switches M1 and M3 through a circuit from the source of electrical energy B to contact R8*c* and R8*b* of relay R8 as will be more fully described later.

The actuation of the relays R8 and R9 is alternative since the energizing of either relay will break the energizing circuit through the contacts thereof to the other relay. That is to say, if relay R9 is energized from the source of electrical energy through the contacts R8*c* and R8*b* of relay R8 the circuit to relay R8 from the source of electrical energy B through contacts R9*c* and R9*a* will be broken due to the movement of the center contact R9*c* into engagement with contact R9*b* of relay R9.

The actuation of relays R8 and R9 is random when either of the selector switches M1 and M3 are closed. That is either relay may be energized first with subsequent energization of the other as will later be explained. It is possible of course due to manufacturing differences in relays R8 and R9 that one of the relays will always be energized first on closing of switches M1 and M3. Such result would not effect the operation of applicant's control circuit. On actuation of the retracting switch M2 the relay R8 will always be energized rather than the relay R9 since the retracting switch M2 does not complete a circuit through the relay R9 as will later be seen.

On energizing relay R9 to the exclusion of relay R8 the field winding F2 of the motor 60 will be energized by the source of electrical energy through relay contacts R9*c* and R9*b* causing rotation of the motor 60 in a direction to cause the vehicle seat to move forward or up depending on which of the solenoids CS2, CS3 and CS4 are energized. In a similar manner energization of relay R8 to the exclusion of relay R9 will energize the motor field winding F1 to cause the motor 60 to rotate in the opposite direction to cause the vehicle seat to be moved down or to the rear. On energizing either of the relays R8 and R9 a circuit is completed through high resistance relay R7 and one of the field windings F1 or F2 in parallel with the other of the field windings whereby the contacts R7*a* and R7*b* of the relay R7 are caused to engage to complete the armature circuit of the motor 60 allowing operation thereof.

The solenoids CS2, CS3 and CS4 are provided to actuate individual clutches to connect the motor 60 to the separate means for adjusting the vehicle seat previously described. The clutch actuating solenoids CS2, CS3 and CS4 are selectively energized in accordance with the direction of rotation of the motor 60 and the position of the vehicle seat in relation to the desired position thereof in a manner to be described later.

The retracting switch M2 as shown in FIGURE 11 includes three pairs of normally open contacts M2*a* and M2*b*, M2*c* and M2*d*, and M2*e* and M2*f*. Insulation is provided between the separate sets of contacts as shown at 140 and 142 in FIGURE 11 so that when retracting switch M2 is actuated the separate pairs of contacts will be closed simultaneously without completing any electrical circuits between the sets of contacts. As illustrated in FIGURE 11 the contacts M2*b*, M2*d* and M2*f* are connected directly to the solenoids CS2, CS3 and CS4, respectively. The contacts M2*a*, M2*c* and M2*e* are connected through limit switches L2, L3 and L4, respectively to the relay R8 and through relay R8 and contacts R9*a* and R9*c* to the source of electrical energy B.

In operation the closing of the retracting switch M2 will complete a circuit from the source of electrical energy B through contacts R9*c* and R9*a* to energize relay R8 and through the limit switches L2, L3 and L4 and the sets of contacts in the retracting switch to energize the coils CS2, CS3 and CS4. The energizing of relay R8 as previously described will cause rotation of the motor 60 in a direction to move the vehicle seat to a fully lowered or retracted position and the seat will assume a fully lowered and retracted position since each of the clutches associated with the solenoids CS2, CS3 and CS4 are actuated. It will be particularly noted that with the limit switches positioned as shown in FIGURE 11 in series between the source of electrical energy and the retracting switch in a plurality of parallel circuits to the solenoids through the retracting switch that as the seat reaches a limiting position with respect to the movement thereof by a particular seat adjusting means the limit switch associated with the solenoid actuating the clutch coupling the motor to the seat adjusting means is opened to cause the circuit through the retracting switch to the particular clutch solenoid associated with said adjusting means to be broken. It will also be noted that the opening of the last of the limit switches L2, L3 and L4, at which time the seat will be in a fully retracted and down position, will break the circuit from the source of electrical energy through the relay R8 and the solenoids to deenergize the motor 60.

The "His" and "Hers" selector switches M1 and M3 as shown in FIGURE 11 are triple pole, single throw switches. The "His" selector switch has contacts M1*a* and M1*b* engageable on actuation of the "His" selector switch to complete a series circuit from the source of electrical energy B through either the relay R8 and limit switch L2, contacts S1*b* and S1*c* of the horizontal sensing switch S1, contacts M1*a* and M1*b* of the "His" selector switch M1 to the clutch actuating solenoid CS2 or through the relay R9, contacts S1*a* and S1*c* of the horizontal sensing switch S1, contacts M1*a* and M1*b* of the "His" selector switch M1 to the clutch actuating solenoid CS2. The determination of the circuit which will be completed by the engaging of the contacts M1*a* and M1*b* of the selector switch M1 will depend on which of the two solenoids R8 and R9 is energized first on closing of the selector switch M1. The position of the vehicle seat at the time of the closing of the selector switch M1 with respect to the desired position thereof will determine if either circuit will be completed as will later be shown.

In a similar manner the contacts M1*c* and M1*d* and contacts M1*e* and M1*f* of the "His" selector switch M1 will complete similar alternative circuits to energize the clutch actuating solenoids CS3 and CS4 respectively, on actuation of the "His" selector switch M1. Likewise closing of the "Hers" selector switch M3 will complete similar alternative circuits to the clutch actuating solenoids CS2, CS3 and CS4 through the contacts M3*a*, M3*b*; M3*c*, M3*d*; and M3*e* and M3*f* of the "Hers" selector switch M3 respectively, and the respective contacts of the sensing switches S4, S5 and S6.

As previously indicated the sensing switches S1, S2, S3, S4, S5 and S6 are positioned within the housing 108 of the memory control device and are actuated by the rack bars 110 in accordance with the position of the vehicle seat. The sensing switches S1, S2 and S3 are operative in conjunction with the "His" selector switch M1 while the sensing switches S4, S5 and S6 are operative in conjunction with the "Hers" selector switch M3. Also as will be noted in FIGURE 11 the sensing switches S1 and S4 cooperate with the respective poles M1*a*, M1*b* and M3*a*, M3*b* of the "His" selector switch M1 and the "Hers" selector switch M3 respectively, to complete a circuit for the energizing of the clutch actuating solenoid CS2 which in operation of the seat control mechanism actuates the clutch coupling the article adjusting means which controls the horizontal movement of the seat to the motor 60. The switches S2 and S5 in conjunction with the poles M1*c*, M1*d* and M3*c*, M3*d* respectively of the "His" selector switch M1 and the "Hers" selector switch M3 complete a circuit through the solenoid CS3 to actuate the clutch coupling the article adjusting means which controls the raising and lowering of the front of the seat to the motor 60. In a similar manner the sensing switch S3 and S6 in conjunction with the poles M1*e*, M1*f* and M3*e* and M3*f* of the switches M1 and M3 complete a circuit to clutch solenoid CS4 to actuate the clutch coupling the article adjusting means which controls the raising and lowering of the rear of the seat to the motor. It will be understood that the energizing of the solenoids CS2, CS3 and CS4 through the sensing switches S1 through S6 on the closing of either the switch M1 or M3 will depend on the position of the seat on the closing of the switches M1 and M3 with respect to the desired position of the seat as indicated by the selection of the particular switch M1 or M3 and by the direction of rotation of the motor 60 which as previously indicated may initially be in either direction of the closing of either the switch M1 or M3. That is to say that when switch M1 is closed the motor 60 will rotate in a particular direction causing circuits to be completed through particular ones of the sensing switches so that the clutch solenoids will be energized which will cause the seat to move in the desired direction. Subsequently the direction of the motor will be reversed and the remaining clutch solenoids will be energized if necessary to further move the seat to the desired position thereof as will be explained in more detail later.

The over-all operation of the control circuit for the memory seat control system will now be considered. Assume first that the seat to be positioned is in any position other than the fully lowered and retracted position and it is desired to move the seat to the fully lowered and retracted position. In this situation an operator seated in the seat has merely to actuate a conveniently located retracting switch M2 to close the pairs of contacts M2*a* and M2*b*; M2*c* and M2*d*; and M2*e* and M2*f* to complete separate parallel circuits through the motor 60 and each of the solenoids CS2, CS3 and CS4. The parallel circuits through the solenoids CS2, CS3 and CS4 include the limit switches L2, L3 and L4 respectively, as previously indicated. The parallel circuit through the motor 60 includes contacts R8c, R8a and field coil F1 in parallel with a coil R7 and field coil F2. The parallel circuits are connected in series with the source of electrical energy B.

As previously mentioned the energizing of field coil F1 through contacts R8a and R8c will cause the motor to rotate in a direction to cause the seat to assume a fully lowered and retracted position. As the seat reaches a horizontal limiting position, that is when the seat is fully rearward, the limit switch L2 will be opened by an abutment 130 as previously disclosed breaking the circuit to the clutch actuating solenoid CS2 to prevent jamming of the seat moving mechanism. Similarly as the front of the seat reaches a fully lowered position the limit switch L3 is caused to open, breaking the circuit to the clutch actuating solenoid CS3 and stopping the lowering of the front of the seat. Also when the rear of the seat assumes the fully lowered position the limit switch L4 is caused to open, breaking the circuit to solenoid CS4 and halting the downward movement of the seat. As will be evident from the parallel nature of the circuits energizing the clutch solenoids the lowering and retracting of the seat will take place simultaneously and any of the limit switches L2, L3 and L4 may be the last to open. It will further be evident from inspection of the circuit diagram of FIGURE 11 that the opening of the last of the limit switches will cause relay R8 to be deenergized thereby breaking the circuit to the motor 60 through contacts R8a and R8c causing the motor to stop. The seat will then be in the fully retracted position with the motor stopped and further actuating of the retracting switch M2 will have no effect on the control circuit.

In the discussion of the over-all operation of the control circuit on the actuation of the "His" selector switch M1 or the "Hers" selector switch M3 it will be assumed that the seat is again in any intermediate position and that it is desired to move the seat to the "His" position. The movement of the seat to the "Hers" position by actuation of the "Hers" selector switch M3 is exactly analogous to the movement of the seat to the "His" position by actuation of the selector switch M1 and therefore will not be considered in detail. For purposes of explanation it will be assumed that the intermediate position in which the seat is found when it is desired to move the seat to the "His" position is such that the racks 110 hold the contacts S1c and S1b of horizontal sensing switch S1 in contact with each other and likewise hold the contacts S2a and S2c of the front riser sensing switch S2 and the contacts S3c and S3b of rear riser sensing switch S3 in contact with each other respectively.

With the seat in such a position the "His" selector switch M1 may be actuated to close the contacts M1a, M1b; M1c, M1d; and M1e, M1f, thereof. On actuation of the selector switch M1 it will be assumed that the relay R9 is first energized through the contacts R8c and R8b to move the contact R9c into engagement with the contacts R9b, thus causing the motor to rotate in a direction to raise the seat and move it forward. Also the clutch solenoid CS3 is energized through relay R9, contacts S2a and S2c of the front riser sensing switch S2 and contacts M1c and M1d of the selector switch M1. The front of the seat is thus caused to move upward into the desired "His" position through connection of the motor 60 to the particular seat adjusting means associated with raising the front of the seat by the clutch actuated by solenoid CS3. On the seat reaching the desired "His" position with respect to the movement thereof by the seat adjusting means associated with the clutch actuated by solenoid CS3 the "His" sensing switch S2 will cause the contacts S2a and S2c to separate thereby breaking the circuit from the source of electrical energy to the solenoid CS3 and at the same time breaking the circuit from the source of electrical energy through relay R9 thereby deenergizing relay R9.

The deenergizing of relay R9 allows the contacts R9b and R9c to separate, deenergizing the motor 60 and allowing the relay R8 to be energized by the source of electrical energy B through contacts R9c and R9a, relay R8, limit switches L2 and L4, contacts S1b and S1c, and S3b and S3c of the "His" horizontal sensing switch S1 and the "His" rear riser sensing switch S3 respectively, and the contacts M1a, M1b and M1e, M1f of the "His" selector switch M1 and solenoids CS2 and CS4 respectively. Energizing of the relay R8 will cause the engagement of the contacts R8a and R8c to energize the field winding F1 of the motor 60 and relay R7 causing rotation of the motor in a direction to move the seat in a rearward direction and to move the rear of the seat in a downward direction.

Also it will be noted that the energizing circuit for the relay R8 as recited above extends through either of two parallel circuits, one including the switch S1, contacts M1a, M1b of switch M1 and solenoid CS2, the other including switch S3, contacts M1e, M1f of selector switch M1 and solenoid CS4. Energizing of the solenoid CS2 through the first of these parallel circuits connects the seat adjusting means which is operable to move the seat to the rear to the motor 60 whereupon the seat will move toward the desired "His" position until the contacts S1c and S1b of the horizontal sensing switch S1 are separated by the seat reaching the "His" position as previously described. In a similar manner energizing the clutch solenoid CS4 through the second of the above mentioned parallel paths will cause the clutch associated therewith to connect the seat adjusting means operable to lower the rear of the seat to the motor 60 whereupon the seat will proceed toward the desired "His" position until the contacts S3c and S3b are caused to separate by the seat reaching the desired "His" position with respect to movement thereof by the particular seat adjusting means associated therewith. On the opening of the last of the switches S1 and S3 the circuits energizing relay R8 are broken, causing the contacts R8a and R8c to separate, thereby deenergizing the motor 60 as before. The seat will now be in the desired preselected "His" position and the motor will be stopped.

Thus applicant provides a memory control system for automobile seats or the like having an improved control circuit wherein a minimum of circuit elements are used to provide maximum control of the memory control system and wherein the seat actuating motor is automatically deenergized when the seat reaches a desired preselected position regardless of the continued actuation of the position selecting switches associated therewith.

The drawings and the foregoing specification constitute a description of the improved memory seat adjustment control circuit in such full, clear, concise and exact terms as to enable any person skilled in the art to practice the invention, the scope of which is indicated by the appended claims.

What I claim as my invention is:

1. In a memory control system for moving an article to a limiting position or a pair of variably adjustable intermediate positions including a plurality of separate article adjustment means, and a plurality of solenoid actuated clutches for selectively coupling said separate article adjustment means to drive means therefor; a control circuit comprising a reversible electric motor for driving the article adjustment means through the clutches, a separate solenoid energizable to actuate each of the plurality of clutches, a source of electrical energy, means for connecting said motor and selected ones of said separate solenoids in parallel with each other and in series with said source of electrical energy for actuating the particular clutches associated with said selected solenoids for effecting movement of said article toward said limiting position and separate switch means in series circuit with each of said selected solenoids operable to separately break the circuit to individual ones of said selected solenoids from said source of electrical energy on said article reaching said limiting position with respect to the adjustment thereof by the adjustment means associated with said individual ones of said selected solenoids and to deenergize said motor when said article is in a fully limiting position.

2. In a memory control system for moving an article to a limiting position or a pair of variably adjustable intermediate positions including a plurality of separate article adjustment means, and a plurality of solenoid actuated clutches for selectively coupling said separate article adjustment means to drive means therefor; a control circuit comprising a reversible electric motor for driving the article adjustment means through the clutches, a separate solenoid energizable to actuate each of the plurality of clutches, a source of electrical energy, means for connecting selected ones of said separate solenoids in parallel with each other and in series with said source of electrical energy for actuating the particular clutches associated with said selected solenoids to connect the article adjustment means associated with the particular clutches for effecting movement of said article to a limiting position, means in series between said source of electrical energy and said selected solenoids operable to complete a circuit between said source of electrical energy and said motor on completion of a circuit between said source of electrical energy and any of said selected solenoids, and separate switch means in series circuit with each of said selected solenoids operable to separately break the circuit to individual ones of said selected solenoids from said source of electrical energy on said article reaching said limiting position with respect to the adjustment thereof by the adjustment means associated with said individual ones of said selected solenoids and to break the circuit from the source of electrical energy to said motor on the breaking of the circuit to the last of said selected solenoids.

3. In a memory control system for moving an article to a limiting position or a pair of variably adjustable intermediate positions including a plurality of separate article adjustment means, and a plurality of solenoid actuated clutches for selectively coupling said separate article adjustment means to drive means therefor; a control circuit comprising a reversible electric motor for driving the article adjustment means through the clutches, a separate solenoid energizable to actuate each of the plurality of clutches, a source of electrical energy, means for connecting selected ones of said separate solenoids and said motor to said source of electrical energy for simultaneously actuating selected ones of the clutches to move said seat to a limiting position, said movement of said seat requiring a plurality of adjustments, means responsive to the completion of one of said adjustments for disconnecting said source of electrical energy from said solenoid associated with the article adjusting means operable to provide said adjustment without disconnecting said motor said source of electrical energy, and means responsive to completion of the last of said adjustments for disconnecting said source of electrical energy from said solenoid associated with the article adjusting means operable to provide said last adjustment and far disconnecting the motor from the source of electrical energy.

4. In a memory control system for moving an article to a limiting position or a pair of variably adjustable intermediate positions including a plurality of separate article adjustment means, and a plurality of solenoid actuated clutches for selectively coupling said separate article adjustment means to drive means therefor; a control circuit comprising a reversible electric motor for driving the article adjustment means through the clutches, a separate solenoid energizable to actuate each of said plurality of clutches, a source of electrical energy, means for connecting said motor and selected ones of said separate solenoids in parallel with each other and in series with said source of electrical energy for actuating the particular clutches associated with said selected solenoids and for effecting movement of said article to a preselected one of said positions, and separate switch means in series circuit with each of said selected solenoids operable to separately break the circuit to individual ones of said selected solenoids from said source of electrical energy on said article reaching said preselected position with respect to the adjustment thereof by the adjustment means associated with said individual ones of said selected solenoids and to deenergize said motor when said article is in a fully limiting position, said control circuit also comprising a retracting switch having a plurality of pairs of separate contacts each pair insulated from the other pairs, each pair of said separate contacts being operable to complete a separate series circuit from said source of electrical energy through different ones of said separate solenoids and the switch means associated therewith.

5. In a memory control system for positioning an adjustable article which is operative to produce selective movement of said article from any intermediate position thereof to a limiting position and a pair of variable preselected intermediate positions, including a plurality of separate means for adjusting said article and a plurality of selectively energizable solenoid operated clutches for selectively coupling said separate article adjusting means to drive means therefor; a control circuit comprising a reversible electric motor for driving the article adjusting means through the clutches, a solenoid associated with each solenoid operated clutch, a source of electrical energy, a retracting switch connected in series between said source of electrical energy and said motor and solenoids, means operatively associated with said retracting switch operable on actuation of said retracting switch for connecting said source of electrical energy to said solenoids and said motor for energization thereof in a manner to cause the article adjusting means to move said article to a fully lowered and retracted position, limit switches connected in series between said source of electrical energy and said retracting switch operable on said article reaching a limiting position with respect to the movement thereof by a particular one of the article adjusting means to deenergize the solenoid associated with the particular one of the article adjusting means without deenergizing said motor and operable on said article reaching a fully lowered and retracted position to deenergize the last of said solenoids and said motor, a second switch connected in series between said source of electrical energy and said solenoids, and means operatively associated with said second switch operable on actuation of said second switch to connect said source of electrical energy to said solenoids and said motor for energizing said motor and solenoids to cause the article adjusting means to move said article to one of said preselected intermediate positions.

6. In a memory control system for positioning an adjustable article which is operative to produce selective movement of said article from any intermediate position thereof to a limiting position and a pair of variable preselected intermediate positions, including a plurality of separate means for adjusting said article and a plurality of selectively energizable solenoid operated clutches for selectively coupling said separate article adjusting means to drive means therefor; a control circuit comprising a reversible electric motor for driving the article adjusting means through the clutches, a solenoid associated with each solenoid operated clutch, a source of electrical energy, a manually actuable retracting switch connected in series between said source of electrical energy and said motor and solenoids, said switch including a plurality of pairs of contacts operable together, each pair of contacts being insulated from the other pairs, means operatively associated with said retracting switch operable on actuation of said retracting switch for connecting said source of electrical energy to said solenoids and said motor for energization thereof in a manner to cause the article adjusting means to move said article to a fully lowered and retracted position, limit switches connected in series between said source of electrical energy and said retracting switch operable on said article reaching a limiting position with respect to the movement thereof by a particular one of the article adjusting means to deenergize the solenoid associated with said particular one of the article adjusting means without deenergizing said motor and operable on said article reaching a fully lowered and retracted position to deenergize the last of said solenoids and said motor, a second manually actuable switch connected in series between said source of electrical energy and said solenoids, and means operatively associated with said second switch operable on actuation of said second switch to connect said source of electrical energy to said solennoids and said motor for energizing said motor and solenoids to cause the article adjusting means to move said article to one of said preselected intermediate positions.

7. In a memory control system for positioning an adjustable article which is operative to produce selective movement of said article from any intermediate position thereof to a limiting position and a pair of variable preselected intermediate positions, including a plurality of separate means for adjusting said article and a plurality of selectively energizable solenoid operated clutches for selectively coupling said separate article adjusting means to drive means therefor; a control circuit comprising a reversible electric motor for driving the article adjusting means through the clutches, a solenoid associated with each solenoid operated clutch, a source of electrical energy, a manually actuable retracting switch connected in series between said source of electrical energy and said motor and solenoids, said switch including a plurality of pairs of contacts operable together, each pair of contacts being insulated from the other pairs, means operatively associated with said retracting switch operable on actuation of said retracting switch for connecting said source of electrical energy to said solenoids and said motor for energization thereof in a manner to cause the article adjusting means to move said article to a fully lowered and retracted position, including a series connection between said source of electrical energy and said motor to energize said motor for rotation in a predetermined direction and means connecting said solenoids to said source of electrical energy in parallel with each other and with said motor, limit switches connected in series between said source of electrical energy and said retracting switch operable on said article reaching a limiting position with respect to the movement thereof by a particular one of said article adjusting means to deenergize the solenoid associated with said particular one of the article adjusting means without deenergizing said motor and operable on said article reaching a fully lowered and retracted position to deenergize the last of said solenoids and said motor, a second manually actuable switch connected in series between said source of electrical energy and said solenoids, and means operativley associated with said second switch operable on actuation of said second switch to connect said source of electrical energy to said solenoids and said motor for energizing said motor and solenoids to cause the article adjusting means to move said article to one of said preselected intermediate positions.

8. In a memory control system for positioning an adjustable article which is operative to produce selective movement of said article from any intermediate position thereof to a limiting position and a pair of variable preselected intermediate positions, including a plurality of separate means for adjusting said article and a plurality of selectively energizable solenoid operated clutches for selectively coupling said separate article adjusting means to drive means therefor; a control circuit comprising a reversible electric motor for driving the article adjusting means through the clutches, a solenoid associated with each solenoid operated clutch, a source of electrical energy, a manually actuable retracting switch connected in series between said source of electrical energy and said motor and solenoids, said switch including a plurality of pairs of contacts operable together, each pair of contacts being insulated from the other pairs, means operatively associated with said retracting switch operable on actuation of said retracting switch for connecting said source of electrical energy to said solenoids and said motor for energization thereof in a manner to cause the article adjusting means to move said article to a fully lowered and retracted position, limit switches connected in series between said source of electrical energy and said retracting switch operable on said article reaching a limiting position with respect to the movement thereof by a particular one of the article adjusting means to deenergize the solenoid associated with said particular one of the article adjusting means without deenergizing said motor and operable on said article reaching a fully lowered and retracted position to deenergize the last of said solenoids and said motor, a pair of other manually actuable switches, each connected in series between said source of electrical energy and said solenoids, and means operatively associated with said other switches operable on movement of either thereof into an actuated position to energize said solenoids and said motor in a manner to cause the article adjusting means to move said article to a predetermined one of said preselected intermediate positions.

9. In a memory control system for positioning an adjustable article which is operative to produce selective movement of said article from any intermediate position thereof to a limiting position and a pair of variable preselected intermediate positions, including a plurality of separate means for adjusting said article and a plurality of selectively energizable solenoid operated clutches for selectively coupling said separate article adjusting means to drive means therefor; a control circuit comprising a reversible electric motor for driving the article adjusting means through the clutches, a solenoid associated with each solenoid operated clutch, a source of electrical energy, a manually actuable retracting switch connected in series between said source of electrical energy and said motor and solenoids, said switch including a plurality of pairs of contacts operable together, each pair of contacts being insulated from the other pairs, means operatively associated with said retracting switch operable on actuation of said retracting switch for connecting said source of electrical energy to said solenoids and said motor for energization thereof in a manner to cause the article adjusting means to move said article to a fully lowered and retracted position, limit switches connected in series between said source of electrical energy and said retracting switch operable on said article reaching a limiting position with respect to the movement thereof by a particular one of the article adjusting means to deenergize the solenoid associated with said particular one of the article adjusting means without deenergizing said motor and operable on said article reaching a fully lowered and retracted position to deenergize the last of said solenoids and said motor, a second manually actuable switch connected in series between said source of electrical energy and said solenoids, and means operatively associated with said second switch operable on actuation of said second switch to connect said source of electrical energy to said solenoids and said motor for energizing said motor and solenoids to cause the article adjusting means to move said article to one of said preselected intermediate positions, said last mentioned means including a relay connected in series between said motor and said source of electrical energy operative to connect said motor to said source of electrical energy for rotation in either of two opposite directions.

10. In a memory control system for positioning an adjustable article which is operative to produce selective movement of said article from any intermediate position thereof to a limiting position and a pair of variable preselected intermediate positions, including a plurality of separate means for adjusting said article and a plurality of selectively energizable solenoid operated clutches for selectively coupling said separate article adjusting means to drive means therefor; a control circuit comprising a reversible electric motor for driving the article adjusting means through the clutches, a solenoid associated with each solenoid operated clutch, a source of electrical energy, a manually actuable retracting switch connected in series between said source of electrical energy and said motor and solenoids, said switch including a plurality of pairs of contacts operable together, each pair of contacts being insulated from the other pairs, means operatively associated with said retracting switch operable on actuation of said retracting switch for connecting said source of electrical energy to said solenoids and said motor for energization thereof in a manner to cause the article adjusting means to move said article to a fully lowered and retracted position, limit switches connected in series between said source of electrical energy and said retracting switch operable on said article reaching a limiting position with respect to the movement thereof by a particular one of said article adjusting means to deenergize the solenoid associated with said particular one of the article adjusting means without deenergizing said motor and operable on said article reaching a fully lowered and retracted position to deenergize the last of said solenoids and said motor to deenergize said solenoids and said motor, a second manually actuable switch connected in series between said source of electrical energy and said solenoids, and means operatively associated with said second switch operable on actuation of said second switch to connect said source of electrical energy to said solenoids and said motor for energizing said motor and solenoids to cause the article adjusting means to move said article to one of said preselected intermediate positions, said last mentioned means including an automatically actuated switch connected between said source of electrical energy and said second switch operable in accordance with the position of said article in relation to the desired position thereof as determined by the actuation of the retracting switch or second switch and the direction of rotation of said motor to complete an electrical connection between selected ones of said solenoids and said source of electrical energy.

11. In a memory control system for positioning an adjustable article which is operative to produce selective movement of said article from any intermediate position thereof to a limiting position and a pair of variable preselected intermediate positions, including a plurality of separate means for adjusting said article and a plurality of selectively energizable solenoid operated clutches for selectively coupling said separate article adjusting means to drive means therefor; a control circuit comprising a reversible electric motor for driving the article adjusting means through the clutches, a solenoid associated with each solenoid operated clutch, a source of electrical energy, a manually actuable retracting switch connected in series between said source of electrical energy and said motor and solenoids, said switch including a plurality of pairs of contacts operable together, each pair of contacts being insulated from the other pairs, means operatively associated with said retracting switch operable on actuation of said retracting switch for connecting said source of electrical energy to said solenoids and said motor for energization thereof in a manner to cause the article adjusting means to move said article to a fully lowered and retracted position, limit switches connected in series between said source of electrical energy and said retracting switch operable on said article reaching a retracted position to deenergize said solenoids and said motor, a second manually actuable switch connected in series between said source of electrical energy and said solenoids, and means operatively associated with said second switch operable on actuation of said second switch to connect said source of electrical energy to said solenoids and said motor for energizing said motor and solenoids to cause the article adjusting means to move said article to one of said preselected intermediate positions, said last mentioned means including a relay and an automatically actuated switch connected in series between said motor and said source of electrical energy operative to connect said motor to said source of electrical energy for initial rotation in one of two opposite directions, to complete an electrical connection between certain of said solenoids and said source of electrical energy depending on the direction of rotation of said motor and the position of said article with respect to the desired position thereof, and to subsequently connect said motor to said source of electrical energy for rotation in the other of said two opposite directions and to complete an electrical connection between the remainder of said solenoids and said source of electrical energy in accordance with the position of said article at the end of the rotation of said motor in said one direction.

12. In a memory control system for positioning an adjustable article which is operative to produce movement of said article from any intermediate position thereof to a limiting position and a pair of variable preselected intermediate positions, including a plurality of separate means for adjusting said article and a plurality of selectively energizable solenoid operated clutches for selectively coupling said separate article adjusting means to drive means therefor; a control circuit comprising a reversible electric motor for driving the article adjusting means through the clutches, a solenoid associated with each solenoid operated clutch, a source of electrical energy, means for connecting said motor in a series circuit with said source of electrical energy causing rotation of said motor in one direction, means for connecting selected ones of said solenoids in separate series circuits with said source of electrical energy whereby said selected ones of said solenoids are energized actuating the clutches associated therewith coupling the associated article adjustment means to said motor to move the article toward a selected one of said positions, means for selectively disconnecting each of said selected ones of said solenoids from said energy source on said article reaching a limiting position with respect to the movement of the article toward the desired position by the article adjustment means associated with said each of said selected ones of said solenoids, means for disconnecting said motor from said source of electrical energy on the disconnecting of the last of said selected ones of said solenoids, means for subsequently connecting said motor in a series circuit with said source of electrical energy for rotation in a direction opposite to said one direction when the position of said article is other than the selected position thereof on the disconnecting of the last of said selected ones of said solenoids, means for connecting the rest of said solenoids in separate series circuits with said source of electrical energy on rotation of said motor in said opposite direction whereby said solenoids are energized to actuate the clutches associated therewith coupling the associated article adjustment means to said motor to complete the movement of said article to said selected position, means to sequentially disconnect said rest of said solenoids from said energy source on said article reaching the selected position thereof with respect to the movement of said article by the article adjustment means associated therewith.

13. In a memory control system for positioning an adjustable article which is operative to produce movement of said article from any intermediate position thereof to and between a limiting position and a pair of variable preselected intermediate positions, including a plurality of separate means for adjusting said article and a plurality of selectively energizable solenoid operated clutches for selectively coupling said separate article adjusting means to drive means therefor; a control circuit comprising a reversible electric motor for driving the article adjusting means through the clutches, a solenoid associated with each solenoid operated clutch, a source of electrical energy, means for connecting said motor in a series circuit with said source of electrical energy causing rotation of said motor in one direction, means for connecting selected ones of said solenoids in separate series circuits with said source of electrical energy whereby said selected ones of said solenoids are energized actuating the clutches associated therewith coupling the associated article adjustment means to said motor to move the article toward a selected one of said positions, means for selectively disconnecting each of said selected ones of said solenoids from said energy source on said article reaching a limiting position with respect to the movement of the article toward the desired position by the article adjustment means associated with said each of said selected ones of said solenoids, including positive responsive switches connected in series between said source of electrical energy and said solenoids, means for disconnecting said motor from said source of electrical energy on the disconnecting of the last of said selected ones of said solenoids, means for subsequently connecting said motor in a series circuit with said source of electrical energy for rotation in a direction opposite to said one direction when the position of said article is other than the selected position thereof on the disconnecting of the last of said selected ones of said solenoids, means for connecting the rest of said solenoids in separate series circuits with said source of electrical energy on rotation of said motor in said opposite direction whereby said solenoids are energized to actuate the clutches associated therewith coupling the associated article adjustment means to said motor to complete the movement of said article to said selected position, means to sequentially disconnect said rest of said solenoids from said energy source on said article reaching the selected position thereof with respect to the movement of said article by the article adjustment means associated therewith.

14. In a memory control system for positioning an adjustable article which is operative to produce movement of said article from any intermediate position thereof to and between a limiting position and a pair of variable preselected intermediate positions, including a plurality of separate means for adjusting said article and a plurality of selectively energizable solenoid operated clutches for selectively coupling said separate article adjusting means to drive means therefor; a control circuit comprising a reversible electric motor for driving the article adjusting means through the clutches, a solenoid associated with each solenoid operated clutch, a source of electrical energy, means for connecting said motor in a series circuit with said source of electrical energy causing rotation of said motor in one direction, means for connecting selected ones of said solenoids in separate series circuits with said source of electrical energy whereby said selected ones of said solenoids are energized actuating the clutches associated therewith coupling the associated article adjustment means to said motor to move the article toward a selected one of said positions, means for selectively disconnecting each of said selected ones of said solenoids from said energy source on said article reaching a limiting position with respect to the movement of the article toward the desired position by the article adjustment means associated with said each of said selected ones of said solenoids, including positive responsive switches connected in series between said source of electrical energy and said solenoids, means for disconnecting said motor from said source of electrical energy on the disconnecting of the last of said selected ones of said solenoids, means for subsequently connecting said motor in a series circuit with said source of electrical energy for rotation in a direction opposite to said one direction when the position of said article is other than the selected position thereof on the disconnecting of the last of said selected ones of said solenoids, means for connecting the rest of said solenoids in separate series circuits with said source of electrical energy on rotation of said motor in said opposite direction whereby said solenoids are energized to actuate the clutches associated therewith coupling the associated article adjustment means to said motor to complete the movement of said article to said selected position, means to sequentially disconnect said rest of said solenoids from said energy source on said article reaching the selected position thereof with respect to the movement of said article by the article adjustment means associated therewith, the last mentioned means being operative to break the circuit to said motor from said energy source on disconnecting of the last of said other solenoids.

15. In a memory control system for moving an article to a limiting position including a plurality of separate article adjustment means, and a plurality of solenoid actuated clutches for selectively actuating said separate article adjustment means; a control circuit comprising an electric motor for driving the article adjustment means through the clutches, a separate solenoid energizable to actuate each of the plurality of clutches, a source of electrical energy, means for connecting said motor and selected ones of said separate solenoids to said source of electrical energy for effecting movement of said article toward said limiting position and switch means in circuit with each of said selected solenoids operable to separately break the circuit to individual ones of said selected solenoids from said source of electrical energy on said article reaching said limiting position with respect to the adjustment thereof by the adjustment means associated with said individual ones of said selected solenoids and to deenergize said motor when said article is in a fully limiting position.

16. In a memory control system for moving an article to a limiting position including a plurality of separate article adjustment means, and a plurality of solenoid actuated clutches for selectively actuating said separate article adjustment means; a control circuit comprising an electric motor for driving the article adjustment means through the clutches, a separate solenoid energizable to actuate each of the plurality of clutches, a source of electrical energy, retracting means for connecting said motor and selected ones of said separate solenoids to said source of electrical energy for effecting movement of said article toward said limiting position and switch means in series circuit between said source of electric energy and retracting means operable to separately break the circuit to individual ones of said selected solenoids from said source of electrical energy on said article reaching said limiting position with respect to the adjustment thereof by the adjustment means associated with said individual ones of said selected solenoids and to deenergize said motor when said article is in a fully limiting position.

17. In a memory control system for moving an article to a limiting position including a plurality of separate article adjustment means, and a plurality of solenoid actuated clutches for selectively actuating said separate article adjustment means; a control circuit comprising an electric motor for driving the article adjustment means through the clutches, a separate solenoid energizable to actuate each of the plurality of clutches, a source of electrical energy, retracting means for connecting said motor and selected ones of said separate solenoids to said source of electrical energy for effecting movement of said article toward said limiting position, said retracting means including a retracting switch having a plurality of pairs of separate contacts, each pair of which are insulated from the other pairs and are actuable by a single control member, and separate switch means in series circuit between said source of electric energy and the pairs of separate contacts of the retracting means operable to separately break the circuit to individual ones of said selected solenoids from said source of electrical energy on said article reaching said limiting position with respect to the adjustment thereof by the adjustment means associated with said individual ones of said selected solenoids and to deenergize said motor when said article is in a fully limiting position.

References Cited in the file of this patent

UNITED STATES PATENTS

| | | |
|---|---|---|
| 2,720,619 | James | Oct. 11, 1955 |
| 2,868,271 | Pickles | Jan. 13, 1959 |
| 2,886,094 | Pickles | May 12, 1959 |